United States Patent
Varma et al.

(10) Patent No.: US 6,725,398 B1
(45) Date of Patent: Apr. 20, 2004

(54) METHOD, SYSTEM, AND PROGRAM PRODUCT FOR ANALYZING A FAULT LOG OF A MALFUNCTIONING MACHINE

(75) Inventors: Anil Varma, Clifton Park, NY (US); Nicholas Edward Roddy, Clifton Park, NY (US); David Richard Gibson, North East, PA (US)

(73) Assignee: General Electric Company, Niskayuna, NY (US)

(*) Notice: Subject to any disclaimer, the term of this patent is extended or adjusted under 35 U.S.C. 154(b) by 376 days.

(21) Appl. No.: 09/627,176

(22) Filed: Jul. 27, 2000

Related U.S. Application Data
(60) Provisional application No. 60/181,855, filed on Feb. 11, 2000.

(51) Int. Cl.$^7$ ................................................ G06F 11/00
(52) U.S. Cl. ......................... 714/25; 714/31; 714/20; 714/48; 714/26; 706/47
(58) Field of Search .................... 714/25, 4, 31, 714/20, 48, 26; 706/47; 700/49

(56) References Cited

U.S. PATENT DOCUMENTS

| | | | |
|---|---|---|---|
| 5,127,005 A | 6/1992 | Oda et al. ................ 371/15.1 |
| 5,463,768 A | 10/1995 | Cuddihy et al. ........ 395/183.13 |
| 5,799,148 A | 8/1998 | Cuddihy et al. ........ 395/183.02 |
| 5,845,272 A | 12/1998 | Morjaria et al. ............. 706/50 |
| 6,012,152 A * | 1/2000 | Douik et al. ................ 714/26 |
| 6,021,411 A * | 2/2000 | Brophy et al. .......... 707/103 R |
| 6,026,393 A * | 2/2000 | Gupta et al. .................. 707/3 |
| 6,263,322 B1 * | 7/2001 | Kirkevold et al. .......... 705/400 |
| 6,321,217 B1 * | 11/2001 | Maeda et al. ................ 706/47 |
| 6,343,236 B1 * | 1/2002 | Gibson et al. ............... 700/79 |
| 6,415,395 B1 * | 7/2002 | Varma et al. ................ 714/26 |
| 6,446,058 B1 * | 9/2002 | Brown ......................... 706/60 |
| 6,484,023 B1 * | 11/2002 | Chen .......................... 455/412 |
| 6,505,103 B1 * | 1/2003 | Howell et al. ................ 701/19 |
| 6,516,427 B1 * | 2/2003 | Keyes et al. ................. 714/25 |
| 6,634,000 B1 * | 10/2003 | Fera et al. .................... 714/37 |
| 6,650,949 B1 * | 11/2003 | Reichenbach et al. ........ 700/79 |

OTHER PUBLICATIONS

Raaphorst et al., "Automated fault–tree generation of operational fault–diagnosis, " IEE Conference on Electric Railways in United Europe, pp. 173–177, Mar. 1995.

Netten et al., "Large–scale fault diagnosis for on–board train systems," Delft University of Technology, Faculty of Technical Mathematics and Informatics, Knowledge Based Systems Group, Julianallaan 132, 2628 BL Delft, The Netherlands; University of Wales Swansea, Department of Electrical and Electronic Engineering, Singleton Park, Swansea SA2 8PP, United Kingdom, pp. 67–76.

* cited by examiner

Primary Examiner—Scott Baderman
Assistant Examiner—Anne L. Damiano
(74) Attorney, Agent, or Firm—David C. Goldman; Patrick K. Patnode (57) ABSTRACT

A system and method are disclosed for aiding a field engineer in the field such as at a remote service facility in analyzing a fault log of a malfunctioning machine such as a locomotive. The method includes obtaining data associated with operation of the malfunctioning machine from a user at a second computing unit coupled via a communications network such as the Internet to a first computing unit such as a centrally located server operable to provide data associated with analysis of the malfunctioning machine, and providing at the second computing unit at least one of a diagnosis of and a repair for the malfunctioning machine based on the data associated with the operation of the malfunctioning machine and the data associated with analysis of the malfunctioning machine.

45 Claims, 4 Drawing Sheets

| CUST | FLEET | RN | DWNLD DATE | TIME | HOURS | # FLTS |
|---|---|---|---|---|---|---|
| RR | | 15501 | 12/17/1998 | 05:49 | 104837.82 | 28 |

| OCCUR DATE | FAULT CODE | OCCUR HOURS | RESET HOURS | LOCO SPED | C T | C H | ENG SPED | VOLT | MAIN AMPS | ALT FLD | WAT TMP | OIL TMP | L L | FAULT DESCRIPTION |
|---|---|---|---|---|---|---|---|---|---|---|---|---|---|---|
| DEC-15 | 1000-1 | 104791.4 | 104791.4 | 0.1 | F | 1 | 439 | 300 | 79 | | 168 | 189 | M | PM3A+ OR IMC2-3, 4, 7 BAD |
| DEC-15 | 1000-1 | 104791.4 | 104791.4 | 0.1 | F | 1 | 436 | 299 | 64 | | 168 | 189 | M | PM3A+ OR IMC2-3, 4, 7 BAD |
| DEC-15 | 2000-2 | 104791.4 | 0.0 | 4.0 | F | 1 | 436 | 399 | 362 | | 168 | 188 | M | FAULT RESET WHILE IN LEV |
| DEC-15 | 1000-4 | 104791.4 | 104791.4 | 4.9 | F | 1 | 436 | 400 | 281 | | 168 | 188 | M | PM3A+ OR IMC2-3, 4, 7 BAD |
| DEC-15 | 3000-1 | 104803.4 | 104803.5 | 0.0 | F | 1 | 577 | 4 | 1 | | 163 | 168 | R | INV1 PROPULSION SYSTEM FAULT |
| DEC-16 | 4000-3 | 104814.4 | 104814.5 | 0.0 | F | 1 | 577 | 3 | 0 | | 168 | 170 | R | INV2 PROPULSION SYSTEM FAULT |
| DEC-16 | 1000-2 | 104814.4 | 104814.4 | 0.0 | F | 1 | 577 | 3 | 0 | | 168 | 170 | R | PM3A+ OR IMC2-3, 4, 7 BAD |
| DEC-16 | 1000-4 | 104814.5 | 104817.0 | 0.0 | F | 1 | 565 | 414 | 3 | | 168 | 170 | M | PM3A+ OR IMC2-3, 4, 7 BAD |

METHOD, SYSTEM, AND PROGRAM PRODUCT FOR ANALYZING A FAULT LOG OF A MALFUNCTIONING MACHINE

CROSS-REFERENCE TO RELATED APPLICATIONS

This application claims the benefit of U.S. Provisional Application No. 60/181,855 filed Feb. 11, 2000, entitled "Delivering Remote Monitoring And Diagnostics Functionality of Stand-Alone Hand-Held Devices For Distributed Field Engineer Support," the contents of which are hereby incorporated in its entirety by reference.

BACKGROUND OF THE INVENTION

The present invention relates generally to machine diagnostics, and more specifically, to methods and systems for analyzing a fault log of a malfunctioning machine and determining a diagnosis of and/or a repair for the malfunctioning machine.

A machine such as a locomotive includes elaborate controls and sensors for monitoring the operation of the locomotive. Anomalous operating conditions of the locomotive are detected by the sensors and trigger the generation of an entry in a fault log.

Each entry in the fault log typically includes the time and the date that the anomalous operating condition occurred, a fault code which corresponds to the detected anomalous operating condition (e.g., inverter failure or air conditioner compressor failure), and a data pack which contains additional information on the operating status of the locomotive (e.g., locomotive notch speed, engine speed, water temperature, and oil temperature) at the time that the anomalous operating condition occurred.

A field engineer will review the fault log of a malfunctioning locomotive and determine a recommended repair. If the fault log is complex, it is often difficult for the field engineer to recommend a repair for the malfunctioning locomotive. Computer implemented case based reasoning systems using a plurality of "gold standard" cases for comparison to a new fault log have been used for aiding a field engineer in analyzing fault logs of malfunctioning machines. Typically, large machine manufacturers have the resources for setting up and maintaining computer implemented case based reasoning systems as part of full service contracts for maintenance of machines purchased by customers.

There is a need for a system and method for distributing diagnostic knowledge to a field engineer at remotely located sites such as remotely located service facilities for aiding the field engineer in analyzing a fault log of a malfunctioning machine to determine a diagnosis of and/or a repair for the malfunctioning machine.

SUMMARY OF THE INVENTION

The present invention provides, in a first aspect, a method for analyzing a malfunctioning machine which includes obtaining data associated with operation of the malfunctioning machine from a user at a second computing unit coupled via a communications network to a first computing unit operable to provide data associated with analyzing the malfunctioning machine, and providing at the second computing unit at least one of a diagnosis of and a repair for the malfunctioning machine based on the data associated with analysis of the operation of the malfunctioning machine and the data associated with the malfunctioning machine.

In another aspect, a method for analyzing a malfunctioning machine includes obtaining at least one distinct fault associated with a fault log of the malfunctioning machine from a user at a second computing unit coupled via a communications network to a first computing unit operable to provide weighted repair and distinct fault cluster combinations associated with analysis of the malfunctioning machine, and providing at the second computing unit a repair for the malfunctioning machine based on the at least one distinct fault and the weighted repair and distinct fault cluster combinations associated with analysis of the malfunctioning machine.

System and computer program products corresponding to the above-summarized methods are also described and claimed herein.

DETAILED DESCRIPTION OF THE INVENTION

Figure 1:
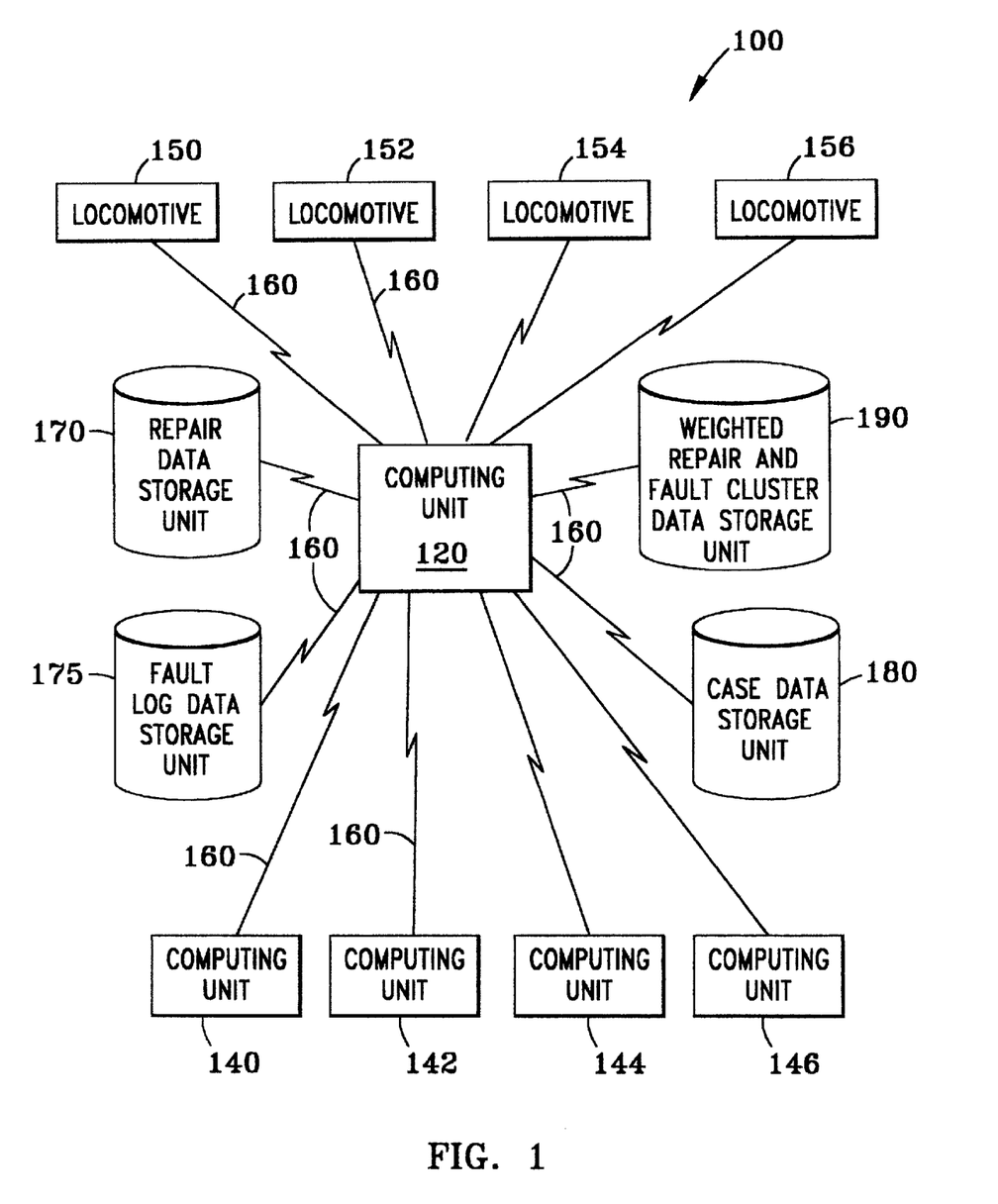
FIG. 1 is a block diagram illustrating one example of a system of the present invention for analyzing a fault log of a malfunctioning machine.

FIG. 1 is a block diagram of one example of a computing environment or system 100 incorporating and using the capabilities and techniques of the present invention. In this embodiment, system 100 desirably leverages data regarding the operation and repair of a plurality of machines such as a plurality of locomotives, and distributes diagnostic knowledge to aid field engineers in the field, e.g., at remotely located service facilities, in analyzing a fault log of a malfunctioning locomotive and determining a diagnosis of and a repair for the malfunctioning machine at the remotely located service facility.

Although the present invention is described in connection with locomotives, the systems and methods of the present invention can be used in conjunction with any machine in which operation of the machine is monitored, such as chemical, electronic, mechanical, or microprocessor machines.

System 100 is desirably maintained by or on behalf of a machine manufacturer such as a locomotive manufacturer or a maintenance or service provider, and is usable by users such as field engineers of railroad operators at the railroad operator's various service facilities in determining a diagnosis of and a repair for a malfunctioning locomotive.

Computing environment 100 includes, for instance, at least one first computing unit 120 coupled to at least one second computing unit 140. As shown in FIG. 1, a plurality of second computing units 140, 142, 144, and 146 are desirably handheld computers, each of which are usable by a field engineer and at a location remote from computing unit 120 such as a centrally located server. First computing unit 120 is coupled to second computing units 140, 142, 144, and 146 via a communications network 160. In addition, a plurality of locomotives 150, 152, 154, and 156 are coupled to first computing unit 120, via communications network 160 or other suitable networks, so that daily, weekly, or monthly operating data such as fault logs of the locomotives can be downloaded to first computing unit 120.

Each computing unit typically includes, for example, one or more central processing units, memory and one or more input/output devices, as is well known in the art. First computing unit 120 is based, for instance, on a Sun workstation running a Unix operating system. First computing unit 120 desirably includes or has access to memory or data storage units, e.g., hard drive(s), compact disk(s), tape drive(s), etc., for storing various data. Data storage units include repair data storage unit 170, fault log data storage unit 175, case data storage unit 180, and weighted repair and distinct fault cluster combinations data storage unit 190, as described in greater detail below. Desirably, the data storage units contain data regarding different model types of a machine and may include data regarding different types of machines.

Second computing units 140, 142, 144, and 146 are, for instance, portable computers, such as handheld personal computers executing Microsoft WINDOWS CE, which runs on an Intel PC architecture.

Communications network 160 typically comprises a local area network or a global communications network such as the Internet which comprises a vast number of computers and computer networks that are interconnected through communication links. The interconnected computers exchange information using various services, such as electronic mail, and the World Wide Web ("WWW"). The WWW service allows computing unit 120 (i.e., Web server or Web site) to send graphical Web pages of information to remote second computing units 140, 142, 144, and 146. The second computing units 140, 142, 144, and 146 can then display the Web pages. Each resource (e.g., computer or Web page) of the WWW is uniquely identifiable by a Uniform Resource Locator ("URL"). To view a specific Web page, for example, second computing unit 140 specifies the URL for that Web page in a request (e.g., a HyperText Transfer Protocol ("HTTP") request). The request is forwarded to the Web server, for example, first computing unit 120, that supports that Web page. When that Web server receives the request, it sends that Web page to second computing unit 140. When second computing unit 140 receives that Web page, it typically displays the Web page using a browser. A browser is a special-purpose application program that effects the requesting of Web pages and the displaying of Web pages. Second computing unit 140 typically uses a browser such as Microsoft INTERNET EXPLORER or Netscape NAVIGATOR.

More particularly, web pages are typically defined using HyperText Markup Language ("HTML"). HTML provides a standard set of tags that define how a Web page is to be displayed. When a field engineer indicates to the browser to display a Web page, the browser sends a request to first computing unit 140 to transfer to second computing unit 140 a HTML document that defines the Web page. When the requested HTML document is received by second computing unit 140, the browser displays the Web page as defined by the HTML document. The HTML document contains various tags that control the displaying of text, graphics, controls, and other features. The HTML document may contain URLs of other Web pages available on first computing unit 120 or other server computer systems.

The above-described computing environment and/or computing units are only offered as examples. The present invention can be incorporated and used with many types of computing units, computers, processors, nodes, systems, workstations and/or environments without departing from the spirit of the present invention.

In this embodiment of system 100, desirably case based reasoning techniques are employed for determining at least one of a diagnosis of and a repair for the malfunctioning machine. For example, conventional case based reasoning techniques assume a collection of fully valid or "gold standard" cases that are used in matching new incoming cases.

Advantageously, system 100 incorporates case based reasoning techniques wherein the gold standard cases or operating and repair data are used to generate weighted repair and distinct fault cluster combinations which are used in determining a diagnosis of or a repair for a malfunctioning machine. Examples of this type of case based reasoning technique are described below and in greater detail in U.S. patent application Ser. No. 09/285,612, filed Apr. 2, 1999, and entitled "Method And System For Processing Repair Data And Fault Log Data To Facilitate Diagnostics"; U.S. patent application Ser. No. 09/285,611, filed Apr. 2, 1999, and entitled "Method And System For Analyzing Fault Log Data For Diagnostics"; and U.S. patent application Ser. No. 09/495,696, filed Feb. 1, 2000, and entitled "Method And System For Analyzing Fault Logs And Continuous Data For Diagnostics", of which all applications are incorporated herein by reference.

Figure 2:
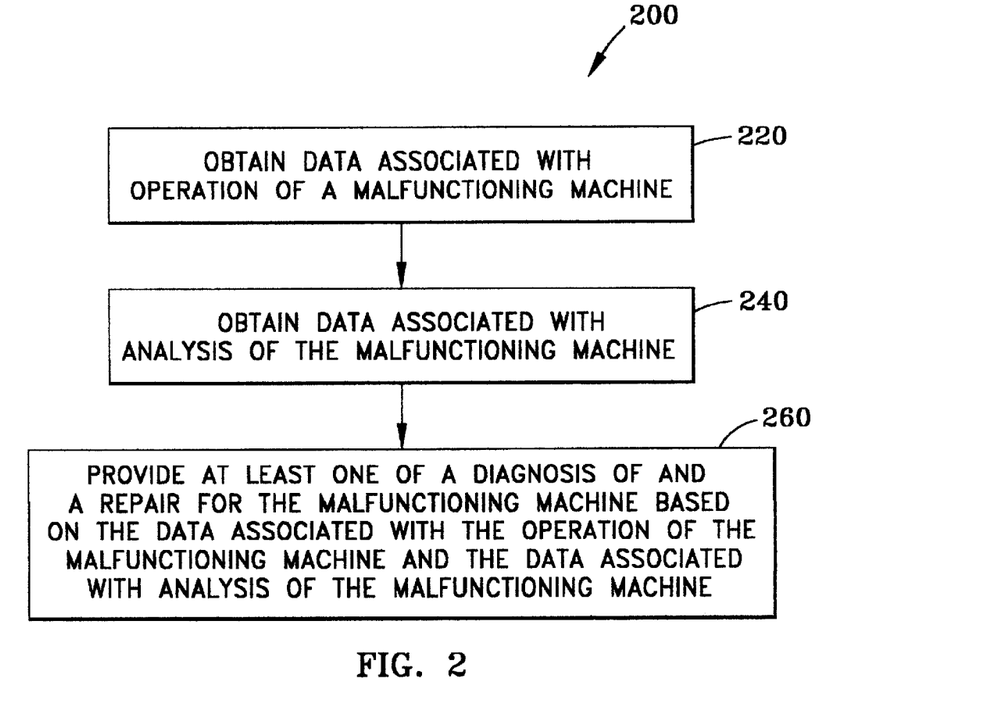
FIG. 2 is a flow diagram of one example of a method, implemented using the system shown in FIG. 1, for analyzing a fault log of a malfunctioning machine.

FIG. 2 illustrates a general overview of one example of a method 200, implemented using, for example, system 100 (FIG. 1), for aiding a field engineer in analyzing a new fault log of a malfunctioning machine and determining a diagnosis of and a repair for the malfunctioning machine. Method 200 includes obtaining data associated with the operation of the malfunctioning machine at 220, obtaining data associated with analysis of the malfunctioning machine at 240, and determining at least one of a diagnosis of and a repair for the malfunctioning machine based on the data associated with the operation of the malfunctioning machine and the data associated with analysis of the machine at 260.

For example, method 200 initially includes a field engineer at second computing unit 140 (FIG. 1) linking to first computing unit 120 (FIG. 1). Desirably, an initial interactive screen is typically downloaded from first computer unit 120 (FIG. 1) to second computer unit 140 (FIG. 1) such as a handheld computer, and displayed. Such an interactive screen desirably includes prompts and entry fields for a user name and a password via a keyboard or mouse.

Figure 3:
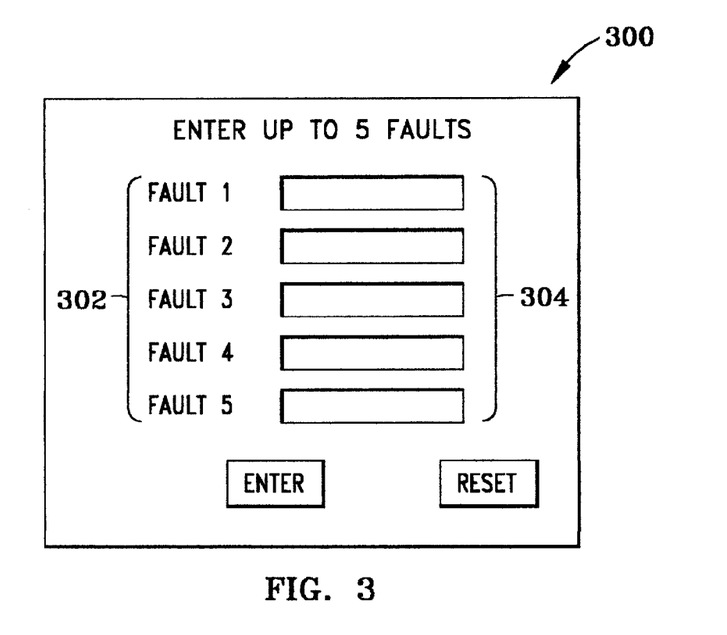
FIG. 3 is an illustration of one example of an interactive screen for prompting and obtaining from a field engineer, operating data such as faults from a fault log of a malfunctioning machine using the system of FIG. 1.

FIG. 3 illustrates one embodiment of an interactive screen 300, displayable using a web browser on a handheld computer, for obtaining data associated with the operation of the malfunctioning machine at 220 (FIG. 2). Interactive screen 300 provides prompts and entry fields for obtaining fault from a fault log, such as fault log 400 shown in FIG. 4, regarding the operation of a malfunctioning machine. Fault logs are typically stored on the locomotive's control system. A field engineer can call up the fault log on a display and scroll down to view the fault log entries or print out a hard copy of the fault log.

Figure 4:
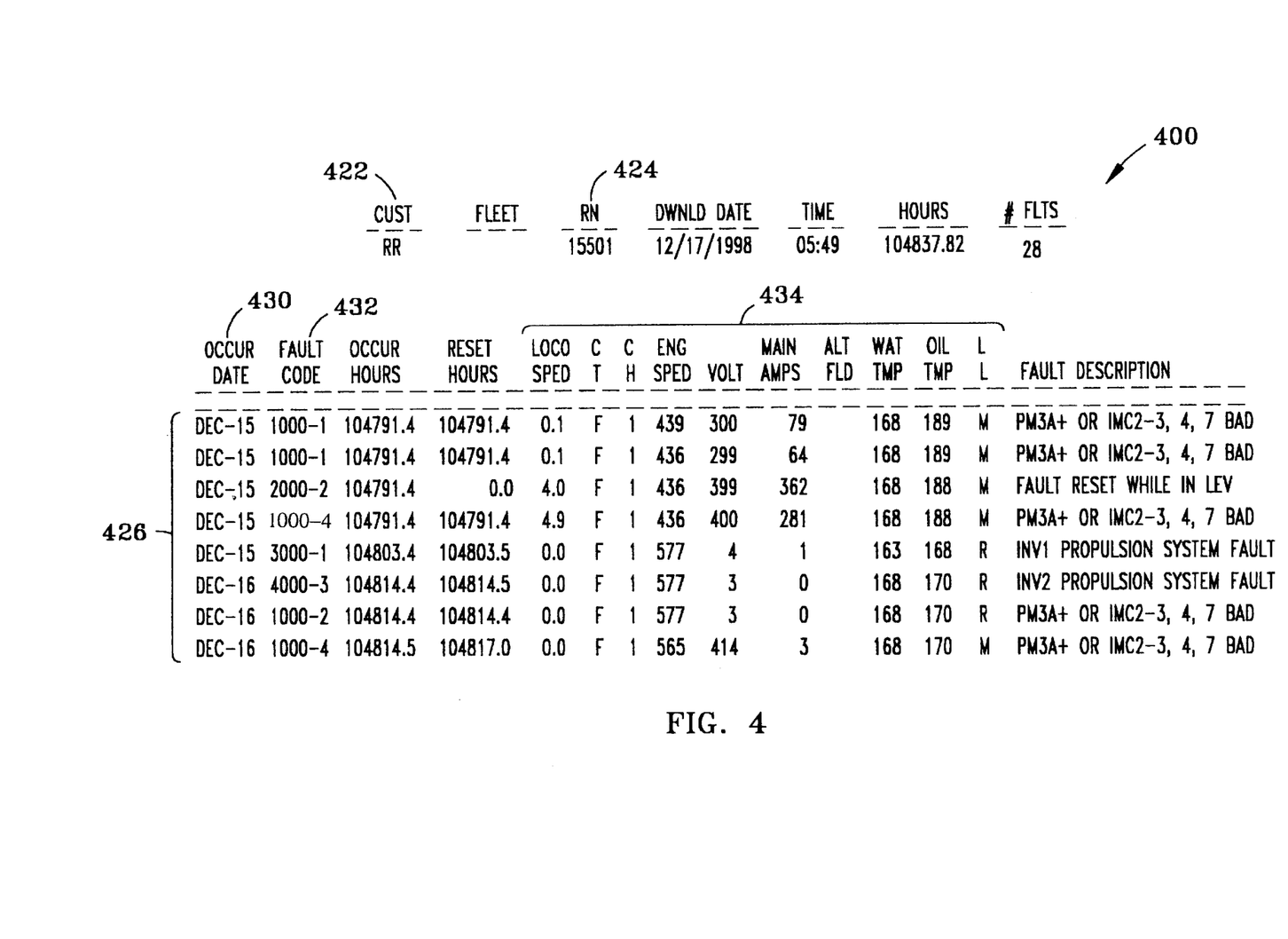
FIG. 4 is an illustration of a portion of a fault log for analysis in the system and by the process shown in FIGS. 1 and 2, respectively.

Typically, fault log 400 includes a customer identification number 422, a locomotive identification number or unit 424, and a plurality of fault entries 426. Each entry typically includes a date 430 that the anomalous operating condition occurred, a fault code 432 associated with each anomalous operating condition, a data pack 434 corresponding to a plurality of operating conditions of the locomotive at the time of the anomalous operating condition. Operating conditions often include locomotive speed, direction of travel, notch position, engine speed, etc. Desirably, the fault log includes a list of anomalous operating conditions occurring over a predetermined period of time prior such as a predetermined number of days (e.g., 14 days). It will be appreciated that other suitable time periods may be chosen. Advantageously, the period of time corresponds to the period of time used for determining weighted repair and distinct fault cluster combinations, as explained below.

With reference again to FIG. 3, in this illustrated interactive screen 300, a plurality of prompts 302 and data entry fields 304 are provided for aiding a field engineer in inputting data such as a plurality of distinct faults which occurred in fault log 400. As used herein, the term "distinct fault" is a fault or a fault code which differs from other faults or fault codes so that, as described in greater detail below, if a portion of the fault log data includes more than one occurrence of the same fault or fault code, the similar faults or fault codes are identified only once.

The distinct fault codes illustrated in FIG. 4 includes fault code 1000 which indicates a phase module malfunction, fault code 4000 which indicates an inverter propulsion malfunction, fault code 2000 which indicates a fault reset, and fault code 3000 which indicates an inverter propulsion malfunction. Once the distinct faults are inputted into interactive screen 300, the field engineer continues by clicking on a "ENTER" button 360, to transmit the distinct faults from second computing unit 140 (FIG. 1) to first computing unit 120 (FIG. 1). Advantageously, using distinct faults reduces the amount of data required to be extracted from the fault log by a field engineer. From the present description, it will be appreciated by those skilled in the art that the case based reasoning technique of the present invention using distinct fault codes is not restricted by the sequential occurrences of fault entries in the fault log.

Data for analyzing the malfunctioning machine at 240 (FIG. 2) is desirably selected based on the data associated with operation of the malfunctioning machine. In this example, data associated with analyzing the malfunctioning machine is obtained from weighted repair and distinct fault cluster combination data storage unit 190 (FIG. 1) based on a plurality of fault cluster combinations of distinct faults from the fault log. The weighted repair and distinct fault cluster combinations are generated by processing historical fault log data and repair data as described in greater detail below.

The distinct fault clusters from fault log 400 include, four single distinct fault clusters (e.g., fault code 1000, fault code 4000, fault code 2000, and fault code 3000), six double distinct fault clusters (e.g., fault codes 2000 and 1000, fault codes 2000 and 4000, fault codes 2000 and 3000, fault codes 1000 and 4000, fault codes 1000 and 3000, and fault codes 4000 and 3000), four triple distinct fault clusters (e.g., fault codes 2000, 1000, and 4000), fault codes 2000, 1000, and 3000, fault codes 2000, 4000, and 3000, and fault codes 1000, 4000, and 3000), and one quadruple distinct fault cluster (e.g., 2000, 1000, 4000, and 3000). From the present description, it will be appreciated by those skilled in the art that a fault log having a greater number of distinct faults would result in a greater number of distinct fault clusters (e.g., ones, twos, threes, fours, fives, etc.).

Each of the distinct fault clusters generated for the fault log of the malfunctioning machine is used in retrieving an assigned weight from weighted repair and distinct fault cluster combinations data storage unit 190 (FIG. 1). Each individual assigned weight and/or the combined individual assigned weights for related repairs are used in determining a diagnosis of and a repair for the malfunctioning machine.

Figure 5:
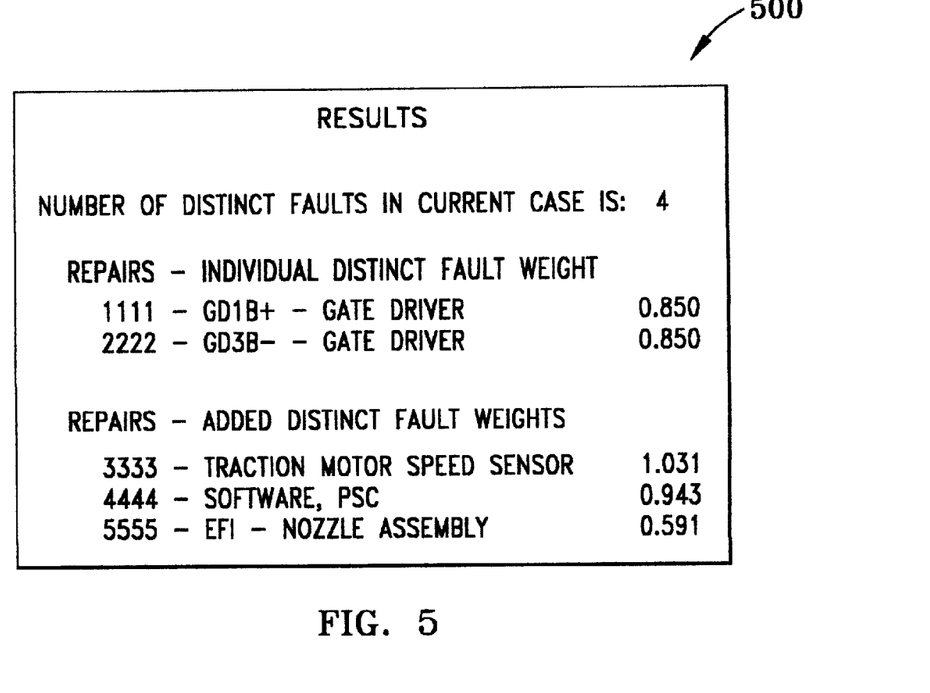
FIG. 5 is an illustration of a display of a diagnosis of and a repair for a malfunctioning machine based on analysis of the fault log shown in FIG. 4.

Advantageously, the top five most likely repair actions are determined based on the predetermined weighted repair and distinct fault cluster combinations having the greatest individual assigned weighted values or which are determined by adding together the individual assigned weighted values for fault clusters having related repairs. The results are presented for review by a field engineer. For example, initially up to five repairs having the greatest individual assigned weights over threshold value (e.g., 70%) are presented. When there is less than five repairs which satisfy the threshold, the remainder of recommended repairs are presented based on a total or combined individual assigned weights for related repairs. FIG. 5 illustrates a display of a diagnosis of and a repair for a malfunctioning machine based on fault log 400 (FIG. 4).

As shown in FIG. 5, repair codes 1111 and 2222, based on a single fault cluster having an assigned weight of 85% indicate a recommended replacement of gate drivers. Repairs for various fault clusters having the highest added or total assigned weight for related repairs include repair code 3333 which corresponds to replacement of a traction motor speed sensor, repair code 4444 which corresponds to replacement of software, and repair code 5555 which corresponds to replacement of a fuel injector nozzle. The process for determining a diagnosis of and a repair for a malfunctioning machine is further described in greater detail in U.S. patent application Ser. No. 09/285,611, filed Apr. 2, 1999, and entitled "Method And System For Analyzing Fault Log Data For Diagnostics".

With reference again to FIG. 1, system 100 is also desirably operable to process historical repair data and historical fault log data regarding one or more locomotives to create a plurality of weighted repairs and distinct fault cluster combinations. For example, repair data storage unit 170 includes repair data or records regarding a plurality of related and unrelated repairs for one or more locomotives and fault log data storage unit 175 includes fault log data or records regarding a plurality of faults occurring for the one or more locomotives.

Repair data from repair data storage unit 170 and fault log data from fault log data storage unit 180 are selected for initially generating a plurality of cases. For example, for a given identification of a repair, the fault log data storage unit 175 (FIG. 1) is searched to select or extract faults occurring over a predetermined period of time prior to the repair. A repair and corresponding distinct faults are summarized as a case. For each case, a plurality of repair and distinct fault cluster combinations are generated (in a similar manner as described for the new fault log data described above. The process is repeated by selecting another repair from repair data to generate another case, and to generate a plurality of repair and distinct fault cluster combinations. Case data storage unit 180 desirably comprises a plurality of cases comprising related and unrelated repairs, and a plurality of repair and distinct fault cluster combinations.

From the plurality of repair and distinct fault cluster combinations, weighted repair and distinct fault cluster combinations are generated. For example, a repair and distinct fault cluster combination is selected and the number of times the combination occurs for related repairs is determined. The number of times the combination occurs in the plurality of cases of related and unrelated repairs, e.g., all repairs for similar locomotives, is also determined. A weight is then determined for the repair and distinct fault cluster combination by dividing the number of times the distinct fault cluster occurs in related cases by the number of times the distinct fault cluster occurs in all, e.g., related and unrelated cases. The process of generating weighted repair and fault cluster combinations is further described in greater detail in U.S. patent application Ser. No. 09/285,612, filed Apr. 2, 1999, and entitled "Method And System For Processing Repair Data And Fault Log Data To Facilitate Diagnostics".

In an alternative embodiment of the method for analyzing a fault log, upon receipt of the field engineer name and password, customized content tailored for the field engineer, e.g., weighted repair and distinct fault cluster combinations as explained in greater detail above, can be downloaded from first computing unit 120 to second computing unit 140. For example, an interactive screen can be provided for obtaining the locomotive type or identification number which can be used for selecting the desired content for downloading from first computing unit 120 to second computing unit 140. Downloading data for analyzing the malfunctioning machine to the handheld computers also allows the data to be periodically updated and usable at remote locations. Advantageously, for example, while the weighted repair and distinct fault cluster combinations are transferred from the first or host computing unit 120 to the second computing unit 140, the selected or inputted information regarding the malfunctioning machine and identification of the specific machine obtained from the field engineer may be obtained.

In another embodiment, a application program or applet can be downloaded to the field engineer's handheld computer which includes programming for receiving data regarding the operation of the malfunctioning machine, data associated with analysis of the malfunctioning machine, and programming (e.g., structure for calculating the output) for processing and determining a diagnosis or repair for the malfunctioning machine. Desirably, the application resides in the erasable memory of the handheld computer of the field engineer and is deleted upon turning off the handheld computer.

From the present description, it will be appreciated by those skilled in the art that the fault log data storage unit can be updated with information from locomotives 150, 152, 154, and 156, and repair data storage unit can be updated with information regarding repairs performed on the locomotives. For example, an interactive screen may be provided for obtaining data regarding whether the diagnosis of or repair for the malfunctioning repair resulted in an acceptable repair of the malfunctioning machine. Desirably, the process of determining the weighted repair and distinct fault cluster combinations are updated periodically, e.g., daily, to provide up-to-date data for the field engineer.

The present invention allows customers, e.g., locomotive fleets, the option of long term full service contracts, or if the size of the fleet or the economic situation of the customer may preclude buying long term full service, purchasing a lower priced, pay-per-use type of solution for diagnostics. In addition, the present invention allows customers maintaining substantial repair facilities of their own to augment the capabilities of their own field engineers. The system can be appropriately priced for web-based delivery for multiple customer on a subscription basis and customized based on the needs of individual customers.

The present invention can also be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for analyzing a malfunctioning locomotive, the method comprising:

obtaining data associated with operation of the malfunctioning locomotive from a user at a second computing unit coupled via a communications network to a first computing unit operable to provide data associated with analysis of the malfunctioning locomotive; and providing at the second computing unit at least one of a diagnosis of and a repair for the malfunctioning locomotive based on the data associated with the operation of the malfunctioning locomotive and the data associated with analysis of the malfunctioning locomotive.

2. The method of claim 1 wherein the providing comprises case based reasoning.

3. The method of claim 1 wherein the data associated with the operation of the malfunctioning locomotive comprises at least a portion of a fault log.

4. The method of claim 1 wherein the data associated with the operation of the malfunctioning locomotive comprises at least one distinct fault from a fault log.

5. The method of claim 1 wherein the data associated with analysis of the malfunctioning locomotive comprises at least one weighted repair and distinct fault cluster combination.

6. The method of claim 1 further comprising transferring the data associated with the operation of the malfunctioning locomotive from the second computing unit to the first computing unit.

7. The method of claim 1 further comprising transferring the data associated with analysis of the malfunctioning locomotive from the first computing unit to the second computing unit.

8. The method of claim 1 wherein the second computing unit is a handheld computer.

9. The method of claim 1 wherein the communications network is a global computer network.

10. A method for analyzing a malfunctioning machine, the method comprising:

obtaining at least one distinct fault associated with a fault log of the malfunctioning machine from a user at a second computing unit coupled via a communications network to a first computing unit operable to provide weighted repair and distinct fault cluster combinations for analyzing the malfunctioning machine; and providing at the second computing unit a repair for the malfunctioning machine based on the at least one distinct fault and the weighted repair and distinct fault duster combinations for analyzing the malfunctioning machine.

11. The method of claim 10 further comprising transferring the data associated with the malfunctioning machine from the second computing unit to the first computing unit.

12. The method of claim 10 further comprising transferring the weighted repair and distinct fault cluster combinations associated with analysis of the malfunctioning machine from the first computing unit to the second computing unit.

13. The method of claim 10 wherein the second computing unit is a handheld computer.

14. The method of claim 10 wherein the malfunctioning machine is a locomotive.

15. The method of claim 10 wherein the communications network is a global computer network.

16. A system for analyzing a malfunctioning locomotive, said system comprising:
    means for obtaining data associated with operation of the malfunctioning locomotive from a user at a second computing unit coupled to a first computing unit via a communications network operable to provide data associated with analysis of the malfunctioning locomotive; and
    means for providing at the second computing unit at least one of a diagnosis of and a repair for the malfunctioning locomotive based on the data associated with analysis of the operation of the malfunctioning locomotive and the data associated the malfunctioning locomotive.

17. The system of claim 16 wherein the means for providing comprises case based reasoning.

18. The system of claim 16 wherein the data associated with the operation of the malfunctioning locomotive comprises at least a portion of a fault log.

19. The system of claim 16 wherein the data associated with the operation of the malfunctioning locomotive comprises at least one distinct fault from a fault log.

20. The system of claim 16 wherein the data associated with analysis of the malfunctioning locomotive comprises at least one weighted repair and distinct fault cluster combination.

21. The system of claim 16 further comprising transferring the data associated with the operation of the malfunctioning locomotive from the second computing unit to the first computing unit.

22. The system of claim 16 further comprising means for transferring the data associated with analysis of the malfunctioning locomotive from the first computing unit to the second computing unit.

23. The system of claim 16 wherein the second computing unit is a handheld computer.

24. The system of claim 16 wherein the communications network is a global computer network.

25. A system for analyzing a malfunctioning machine, said system comprising:
    means for obtaining at least one distinct fault associated with a fault log of the malfunctioning machine from a user at a second computing unit coupled via a communications network to a first computing unit operable to provide weighted repair and distinct fault cluster combinations associated with analysis of the malfunctioning machine; and
    means for providing at the second computing unit a repair for the malfunctioning machine based on the at least one distinct fault and the weighted repair and distinct fault cluster combinations associated analysis of with the malfunctioning machine.

26. The system of claim 25 further comprising means for transferring the data associated with the operation of the malfunctioning machine from the second computing unit to the first computing unit.

27. The system of claim 25 further comprising means for transferring the weighted repair and distinct fault cluster combinations associated with analysis of the malfunctioning machine from the first computing unit to the second computing unit.

28. The system of claim 25 wherein the second computing unit is a handheld computer.

29. The system of claim 25 wherein the malfunctioning machine is a locomotive.

30. The system of claim 25 wherein the communications network is a global computer network.

31. At least one program storage device readable by a machine, tangibly embodying at least one program of instructions executable by the machine to perform a method for analyzing a malfunctioning locomotive, the method comprising:
    obtaining data associated with operation of the malfunctioning locomotive from a user at a second computing unit coupled via a communications network to a first computing unit operable to provide data associated with analysis of the malfunctioning locomotive; and
    providing at the second computing unit at least one of a diagnosis of and a repair for the malfunctioning locomotive based on the data associated with the operation of the malfunctioning locomotive and the data associated with analysis of the malfunctioning locomotive.

32. The at least one program storage device of claim 31 wherein the providing comprises case based reasoning.

33. The at least one program storage device of claim 31 wherein the data associated with the operation of the malfunctioning locomotive comprises at least a portion of a fault log.

34. The at least one program storage device of claim 31 wherein the data associated with the operation of the malfunctioning locomotive comprises at least one distinct fault from a fault log.

35. The at least one program storage device of claim 31 wherein the data associated with analysis of the malfunctioning locomotive comprises at least one weighted repair and distinct fault cluster combination.

36. The at least one program storage device of claim 31 further comprising transferring the data associated with the operation of the malfunctioning locomotive from the second computing unit to the first computing unit.

37. The at least one program storage device of claim 31 further comprising transferring the data associated with analysis of the malfunctioning locomotive from the first computing unit to the second computing unit.

38. The at least one program storage device of claim 31 wherein the second computing unit is a handheld computer.

39. The at least one program storage device of claim 31 wherein the communications network is a global computer network.

40. An article of manufacture comprising:
    at least one computer usable medium having computer readable program code means embodied therein for causing the analyzing of a malfunctioning machine, the computer readable program code means in said article of manufacture comprising:

computer readable program code means for causing a second computing unit to obtain at least one distinct fault associated with a fault log of the malfunctioning machine from a user at the second computing unit coupled via a communications network to a first computing unit operable to provide weighted repair and distinct fault cluster combinations associated with analysis of the malfunctioning machine; and computer readable program code means for causing the second computing unit to provide a repair for the malfunctioning machine based on the at least one distinct fault and the weighted repair and distinct fault cluster combinations associated with analysis of the malfunctioning machine.

41. The article of manufacture of claim 40 further comprising computer readable program code means for causing the second computing unit to transfer the data associated with the malfunctioning machine from to the first computing unit.

42. The article of manufacture of claim 40 further comprising computer readable program code means for causing the first computing unit to transfer the weighted repair and distinct fault cluster combinations associated with analysis of the malfunctioning machine to the second computing unit.

43. The article of manufacture of claim 40 wherein the second computing unit is a handheld computer.

44. The article of manufacture of claim 40 wherein the malfunctioning machine is a locomotive.

45. The article of manufacture of claim 40 wherein the communications network is a global computer network.

* * * * *